United States Patent
Gabrielle et al.

(10) Patent No.: US 12,054,037 B2
(45) Date of Patent: Aug. 6, 2024

(54) HEATING SEAL FOR A WINDOW OF A VEHICLE

(71) Applicant: Hutchinson, Paris (FR)

(72) Inventors: Brice Gabrielle, Montargis (FR); Olivier Blottiau, Amilly (FR); Frank Szymczak, Dannemois (FR); Serge Thibault, Paris (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 17/936,530

(22) Filed: Sep. 29, 2022

(65) Prior Publication Data
US 2023/0103627 A1    Apr. 6, 2023

(30) Foreign Application Priority Data

Oct. 1, 2021 (FR) ........................................ 2110423

(51) Int. Cl.
*B60J 10/60* (2016.01)
*H05B 3/84* (2006.01)

(52) U.S. Cl.
CPC ................ *B60J 10/60* (2016.02); *H05B 3/84* (2013.01)

(58) Field of Classification Search
CPC .............. B60J 10/60; B60J 10/75; H05B 3/84
USPC ............................................................. 49/70
See application file for complete search history.

(56) References Cited

U.S. PATENT DOCUMENTS

| | | | | |
|---|---|---|---|---|
| 5,493,815 A * | 2/1996 | Belser | ...................... | B60J 10/75 49/377 |
| 6,266,925 B1 * | 7/2001 | Camerer | .................. | B60J 10/00 49/498.1 |
| 8,429,855 B2 * | 4/2013 | Stefanelli | ................. | B60J 10/75 49/440 |
| 9,840,207 B2 * | 12/2017 | Blottiau | .............. | B29C 45/0003 |
| 9,994,095 B2 * | 6/2018 | Sato | .......................... | B60J 10/24 |
| 11,019,689 B2 * | 5/2021 | Deering | .................. | B29C 45/14 |
| 2013/0312330 A1 * | 11/2013 | Sturgell | ................... | B60J 10/75 49/70 |

FOREIGN PATENT DOCUMENTS

| | | |
|---|---|---|
| CA | 2274639 A1 | 6/1998 |
| DE | 19651733 A1 | 6/1998 |

(Continued)

OTHER PUBLICATIONS

English translation of DE 102019214029 from WIPO (Year: 2020).*

*Primary Examiner* — Daniel J Troy
*Assistant Examiner* — Susan M. Heschel
(74) *Attorney, Agent, or Firm* — Browdy and Neimark, PLLC

(57) ABSTRACT

A seal for a window of a vehicle, in particular for a motor vehicle, this seal comprising:
- a body which is generally elongated;
- at least one flocking located on a surface of said body and extending along the body, and
- at least one multilayer heating film which is generally elongated along said body and which is interposed between the flocking and said surface of said body, this heating film comprising:
- at least two electrically conductive straight strips which extend parallel to each other and to said axis, at a distance from each other, and which are intended to be connected to an electrical circuit, and
- at least one resistive heating track which extends between said strips and is connected to these strips.

19 Claims, 7 Drawing Sheets

(56) References Cited

FOREIGN PATENT DOCUMENTS

| | | | |
|---|---|---|---|
| DE | 102018107099 A1 | | 9/2019 |
| DE | 102019214029 A1 | * | 3/2020 |
| EP | 3031645 A1 | | 6/2016 |
| FR | 3062085 A1 | | 7/2018 |

* cited by examiner

[Fig.1]
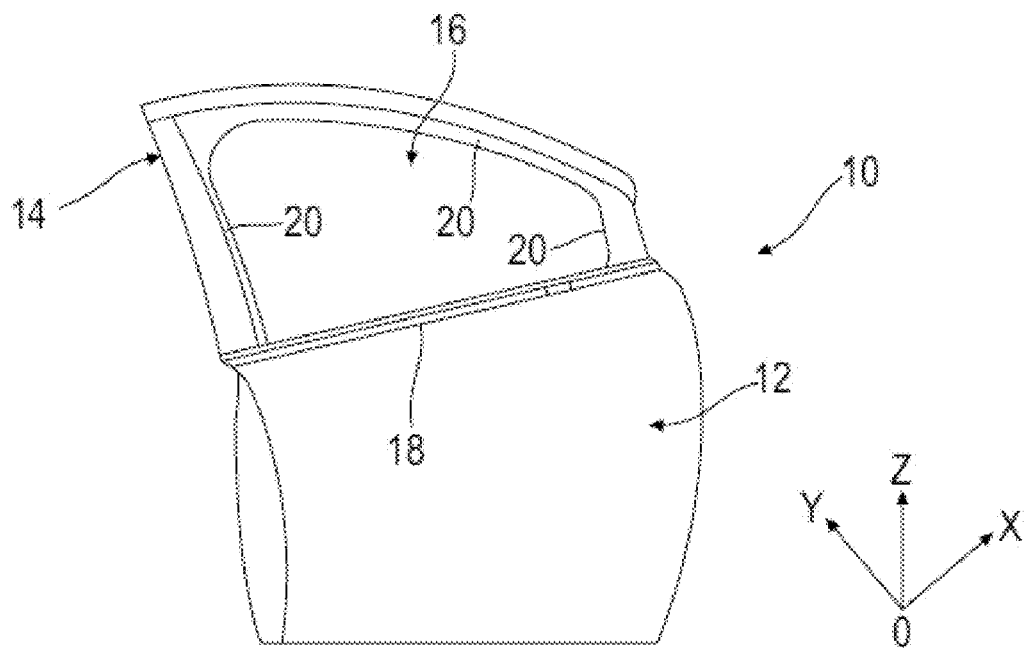
[Fig.2]
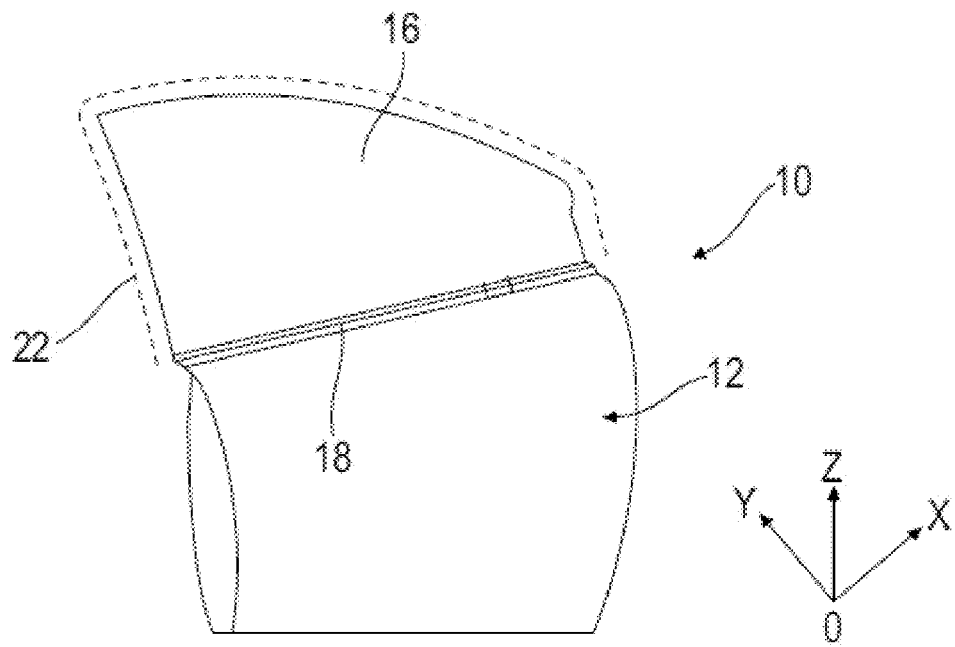

[Fig.3]
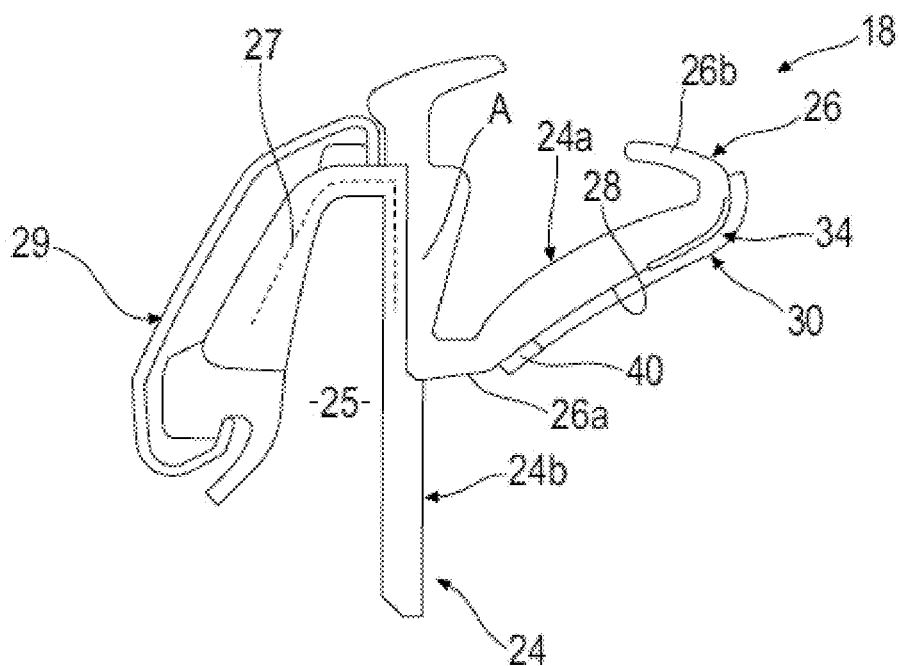
[Fig.4]
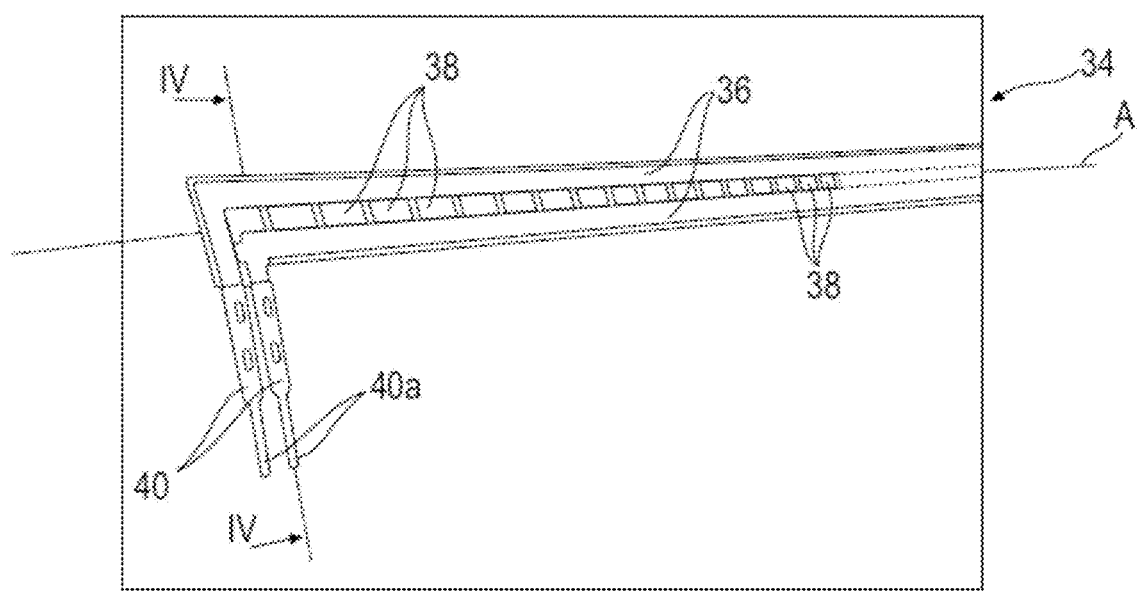

[Fig.4a]
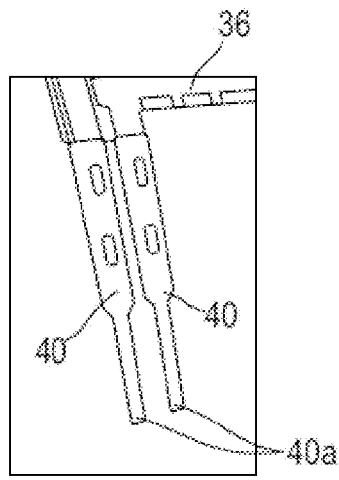
[Fig.4b]
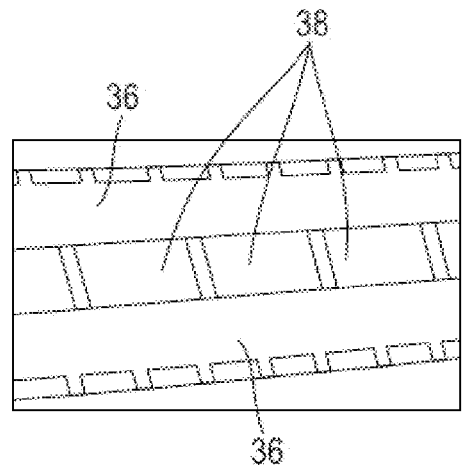
[Fig.4c]
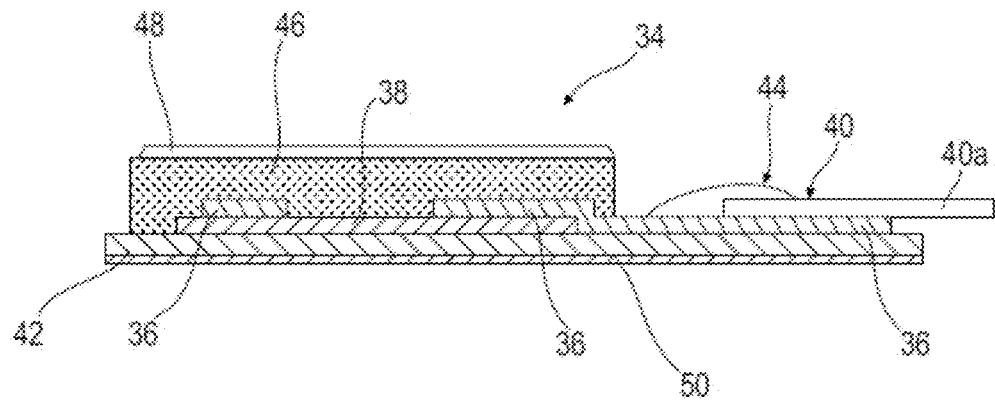
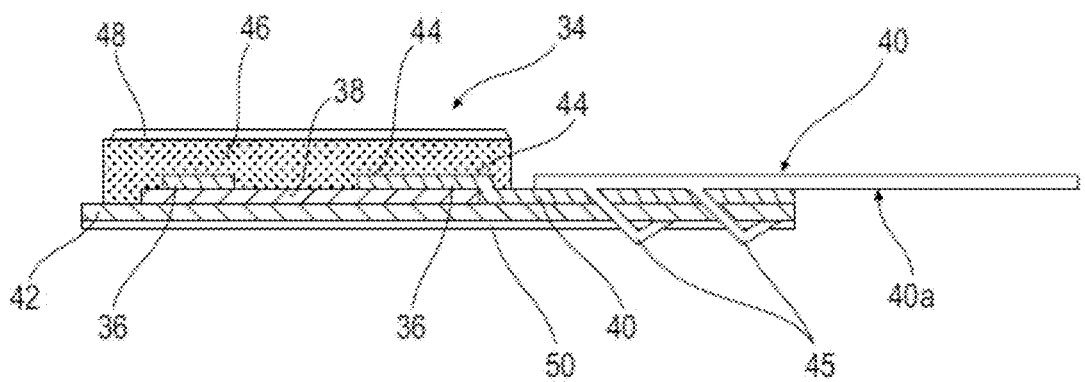
[Fig. 4d]

[Fig.5]
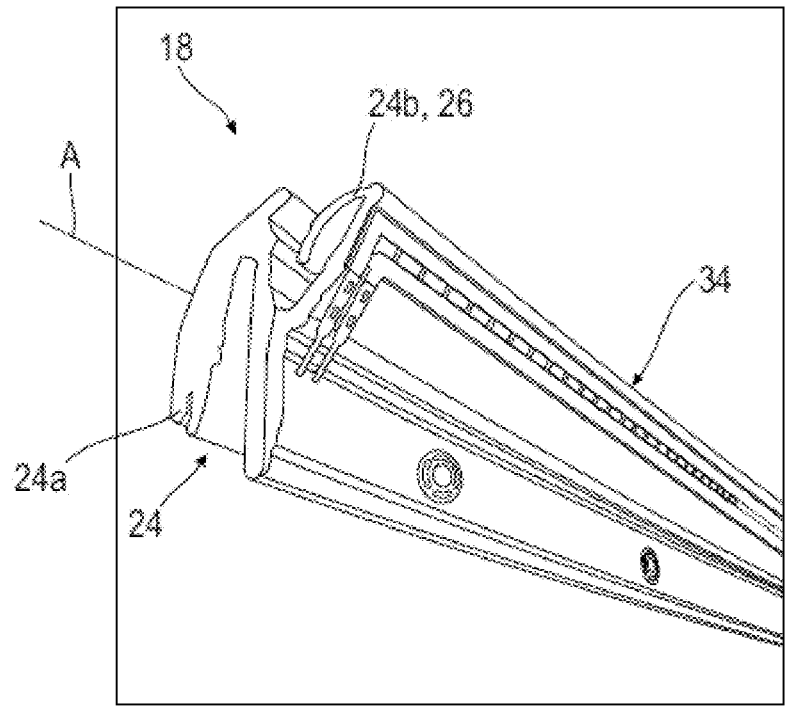
[Fig.6]
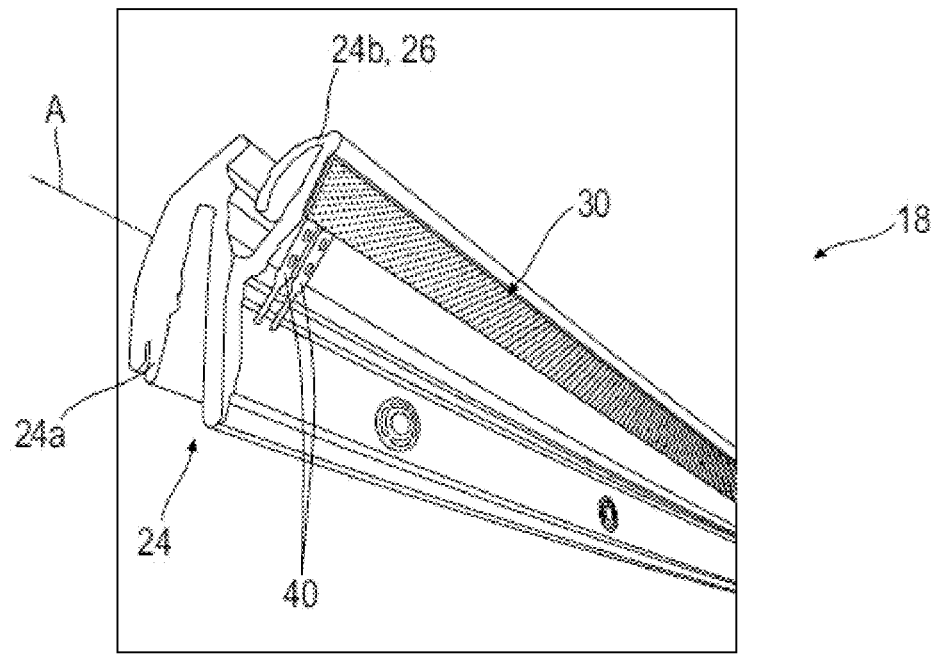

[Fig.7]
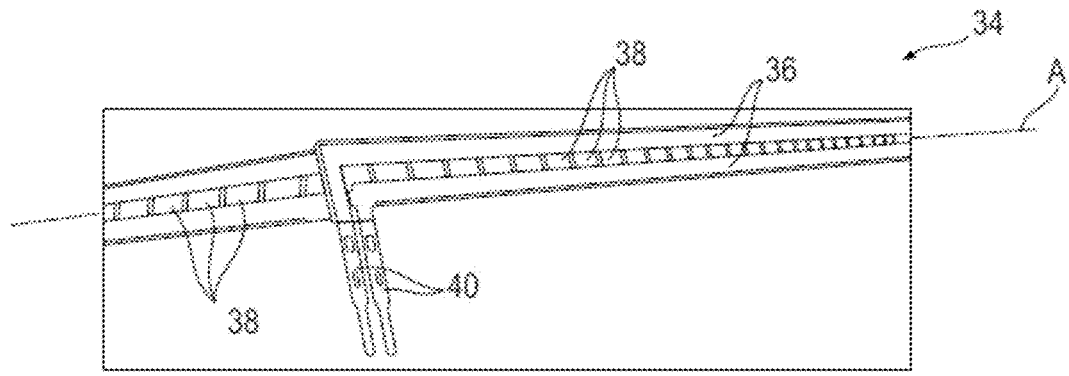
[Fig.8]
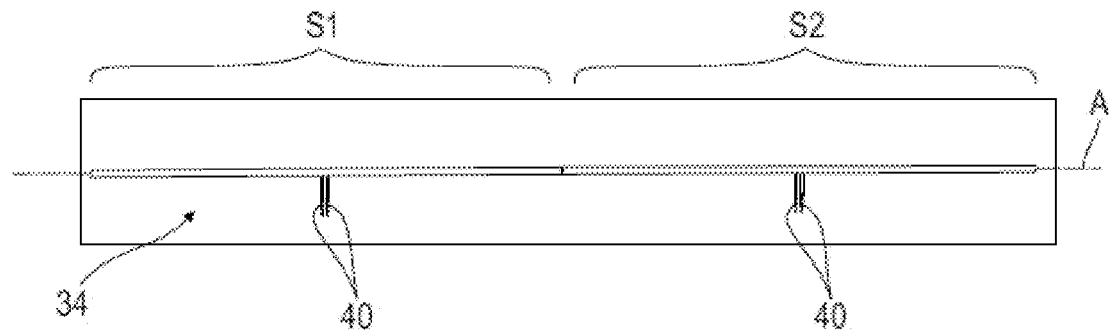
[Fig.9]
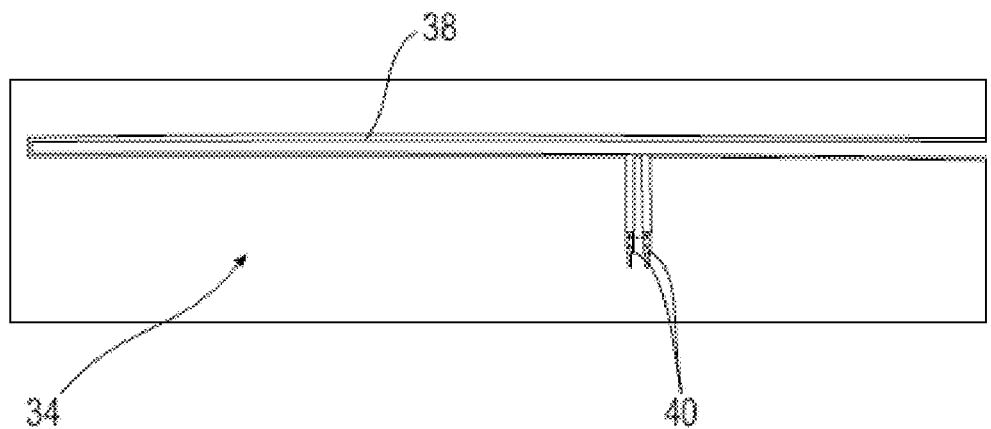

[Fig.10]
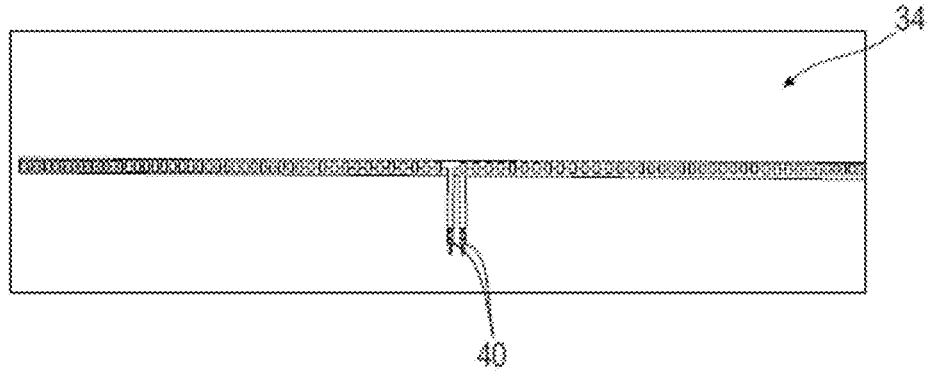
[Fig.11]
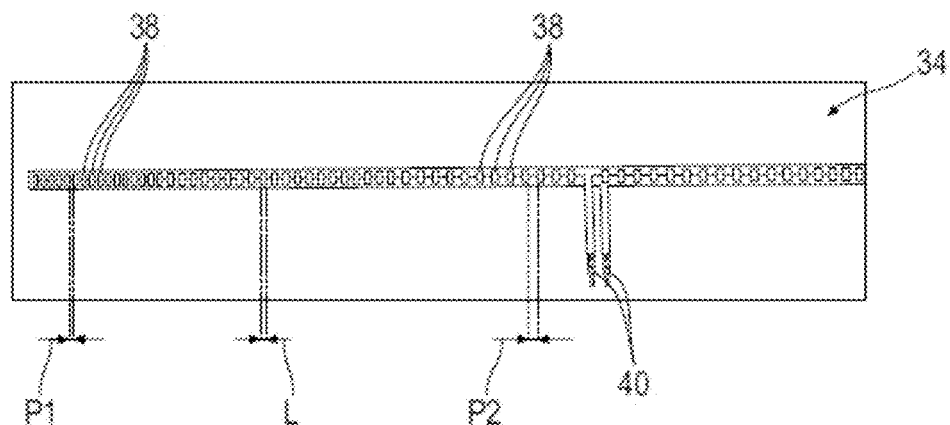
[Fig.12]
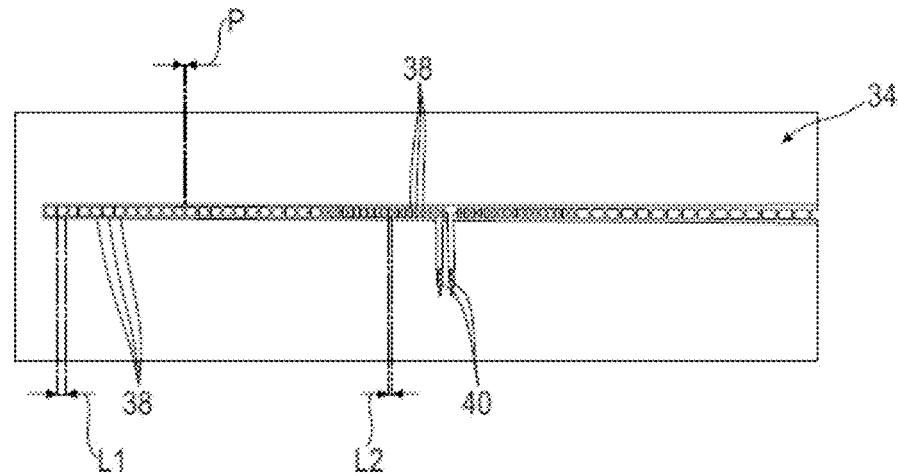

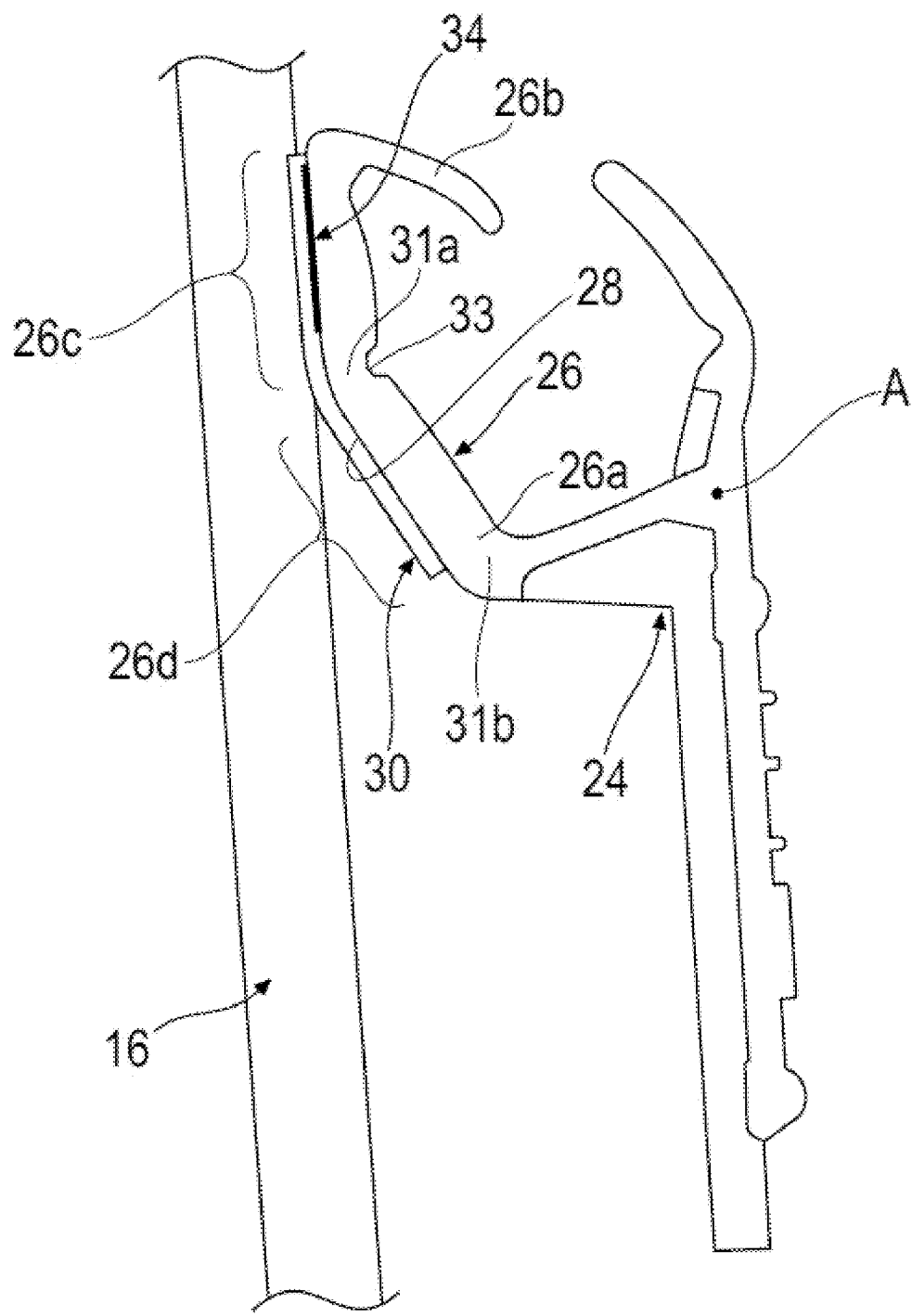
[Fig. 13]

HEATING SEAL FOR A WINDOW OF A VEHICLE

TECHNICAL FIELD OF THE INVENTION

The present invention relates in particular to a heating seal for a window of a vehicle, in particular for a motor vehicle.

TECHNICAL BACKGROUND

The windows of a motor vehicle can be heated directly or indirectly, for example in winter, in order to melt the frost deposited on the windows or to remove the fog from these windows.

A vehicle rear window comprises, for example, a heating element of resistive material deposited by serigraphy directly onto a surface of the window and powered by an electrical circuit.

It has already been proposed to equip a window seal with a heating element. The heating element functions to heat a portion of the seal which is configured to frictionally or slidingly cooperate with the window. The heat is then transferred by conduction from the seal to the window and allows to melt the frost or removes the fog. A heating seal in the prior art comprises, for example, a heating wire of resistive material which is integrated into the material of the seal.

However, this technology is not satisfactory. The heating wire allows only a small portion of the seal to be heated. To heat a larger portion of the seal, additional heating wires would have to be added or the heating wire would have to be oversized, which would increase the cost of the heating seal.

On the other hand, this type of heating seal is relatively complex and expensive to produce. The seal is usually produced by extruding a material through a die. As the heating wire must be integrated into the body of the seal, it must feed the die during the extrusion. After manufacture, the body of the seal and the heating wire are inseparable. In the event that the body of the seal would comprise a defect, it is not possible to recover the heating wire for re-use with another body. Moreover, after manufacture, the resulting seal is not yet functional. The longitudinal ends of the body of the seal must be removed to expose the longitudinal ends of the heating wire for connection to an electrical circuit.

It is also known to equip a seal with a flocking to facilitate the sliding of a portion of the seal against the window. In the present application, flocking means a layer of generally short and fine fibres. In the event of frost, ice may be present between the window and the seal and secure the flocking of the seal to the window. The heating of the seal, at the level of the flocking, would allow the seal to be detached from the window. However, as the flocking would be larger than the heating wire, the latter would not allow to heat the entire flocking and thus effectively defroze the seal and the window.

The present invention proposes a solution to at least some of the problems of the prior art, this solution being simple, effective and economical.

SUMMARY OF THE INVENTION

The invention relates to a seal for a window of a vehicle, in particular for motor vehicle, this seal comprising:
  a body which has a generally elongated shape along an axis and which is made of at least one material,
  at least one flocking located on a surface of said body and extending along said axis, and
  at least one heating element extending along said axis,
  characterised in that said at least one heating element comprises at least one heating film which has a generally elongated shape along said axis and which is interposed between the flocking and said surface of said body, this heating film comprising:
    at least two electrically conductive straight strips which extend parallel to each other and to said axis, at a distance from each other, and which are intended to be connected to an electrical circuit, and
    at least one resistive heating track which extends between said strips and is connected to these strips.

According to the invention, the heating element is in the form of an elongated film. This is particularly advantageous because, unlike a heating wire, at the same power the film can heat a larger surface area of the seal.

In addition, the heating film is not integrated into the material of the body of the seal. It is interposed between a surface of the body and a flocking, i.e. it can be attached to the surface of the body after it has been manufactured. This is advantageous because the heating element does not need to feed the die for the manufacture of the body of the seal, in particular by extrusion. The heating film can be attached to the body of the seal by gluing, for example.

The film is multi-layered, i.e. it comprises a superposition of several layers formed in particular by the strips and the track or the tracks.

Furthermore, the heating film is located underneath the flocking and it is therefore understood that the dimensions of the heating film can be adapted to the dimensions of the flocking so that a large surface area or even the entire surface of the flocking is heated directly by the heating film. This also allows to improve the heating efficiency of the seal and the window which is intended to cooperate with the seal by sliding and in particular its flocking.

The seal according to the invention may comprise one or more of the following characteristics, taken alone or in combination with each other:
  the body comprises an elastically deformable lip extending along said axis and comprising said surface;
  the lip comprises two adjacent longitudinal segments connected each other by a first longitudinal hinge integrated into that lip, said at least one flocking extending over at least one of those longitudinal segments and said at least one heating film being located on at least one of those longitudinal segments;
  said at least one flocking extends over both longitudinal segments and said at least one heating film is located on only one of these longitudinal segments;
  said lip comprises a second longitudinal hinge integrated into said lip, said second hinge being located at a distance from the first hinge and located at the junction of the lip with the rest of the body;
  said at least one flocking extends to the level of said second hinge;
  said first hinge is formed by a thinning of said lip and/or by a longitudinal groove,
  said longitudinal groove is formed on a face of the lip opposite to said surface;
  said at least one material is TPE or said lip is TPE;
  said strips are respectively connected to at least two terminals for connection to said electrical circuit;
  said flocking covers said strips and the track or the tracks, but does not cover said terminals; the flocking is therefore located away from the terminals;

said terminals are located at the level of one longitudinal end of the body;

said terminals are located at a distance from the longitudinal ends of the body and for example in the middle of said body or said film;

said terminals are made of metal;

the strips and the track or the tracks are covered by a passivation layer, and said flocking covers this passivation layer; the passivation layer has the function of electrically insulating the strips and the track or the tracks, and thus protecting them from moisture for example;

the strips are identical, in particular they have identical dimensions;

the strips have a width or transverse dimension of between 0.2 and 10 mm, and preferably between 0.2 and 5 mm; in the present application, a width or transverse dimension is measured along an axis perpendicular to the axis of elongation of the seal and of the film;

the or each heating track is straight;

the or each heating track is perpendicular to the strips;

the or each heating track has an axial length or dimension of between 0.1 and 25 mm, and preferably between 0.1 and 10 mm; in the present application, an axial length or dimension is measured along the axis of elongation of the seal and of the film;

the strips partially overlap the track or the tracks, or the track or the tracks partially overlap the strips; this overlap ensures the electrical connection between the strips and the track or the tracks;

the strips are separated by a distance (inter-strip distance) that is less than the width of the track or the tracks whose ends overlap the strips or are overlapped by the strips;

the or each heating track has an axial length or dimension which is at least 90% of the axial length or dimension of the strips, and which is for example between 1000 and 1500 mm;

the electrically conductive strips are made of silver and/or the track or the tracks is/are made of carbon, e.g. with PTC effect;

the electrically conductive strips and/or the track or the tracks are printed and cured ink layers; the ink can be an ink intended to cure by drying and evaporation of a solvent for example; alternatively, the ink can be an ink intended to cure by polymerisation or cross-linking;

the strips and the track or the tracks are carried by a plastic support, for example made of PET;

said heating film is a multilayer film;

said heating film comprises at least one glue layer;

the glue layer is a heat sealable layer;

a lower glue layer is located under said heating film or under said plastic support, for attaching the heating film to the surface of the body;

an upper glue layer is located on said film for attaching the flocking to said film;

the heating film has a thickness of between 10 and 500 µm, and preferably between 100 and 300 µm, and/or a width or transverse dimension of between 2 and 10 mm, and preferably between 3 and 8 mm;

the body comprises a longitudinal portion which extends along said axis and which is generally U-shaped in cross-section, this portion being made of an optionally reinforced plastic material;

the heating film is integrally covered by the flocking;

the flocking comprises a flock (fibres) or a support, e.g. plastic, to which a flock is attached; the support of the flock can be configured to protect the heating film against moisture for example;

the seal is a door seal or a door framing of a motor vehicle, such as a licker;

the heating film comprises a plurality of tracks connected to said strips;

the tracks are parallel to each other;

the tracks are perpendicular to the strips or inclined to these strips;

said heating film comprises two first electrically conductive strips between which at least one heating resistive track extends, and two second electrically conductive strips between which at least one further heating resistive track extends, said second strips extending in the extension of said first strips;

the first electrically conductive strips are connected to first connecting terminals, and said second electrically conductive strips are connected to second connecting terminals;

the tracks have identical lengths;

alternatively, at least some of the tracks have different lengths; preferably, the tracks located at the longitudinal ends of the heating film or the body of the seal have greater lengths than those at a distance from those ends;

the film is flexible;

the film adopts the shape of the surface it covers and may have a portion with a curved shape cross-section;

the heating film is configured to be powered at an electrical power of less than 100 W per metre, and which is for example between 10 and 100 W for a length of 1 m; and the heating film is configured to heat to a temperature of between 1 and 100° C. at an outside atmospheric temperature of, for example, −40 to 10° C.

The present invention also relates to an assembly comprising a seal as described above, and a window of a vehicle, in particular a motor vehicle, the window being configured to cooperate with the seal by sliding on its flocking.

The present invention also relates to a door or a door framing of a vehicle, in particular for motor vehicle, comprising such an assembly. In the case of a door, the seal is, for example, a licker for a movable window of this door. The connecting terminals preferably extend downwards from the seal so that they are located in a casing of the door. They are then located in a dry area and can be connected to the above mentioned electrical circuit.

The present invention further relates to a method for manufacturing a seal as described herein, said method comprising the steps of:

a) manufacturing the body of the seal, preferably by extrusion, and b) attaching the heating film and the flocking to the body of the seal, preferably by gluing.

Prior to step b), the heating film and the flocking are preferably secured to each other, preferably by gluing. The flocking can be carried out directly on the heating film. Alternatively, the flocking comprises fibres carried on a support, for example plastic, and this support is preferably attached by gluing to the heating film. Prior to step b), the heating film may be in the form of a roll or a reel and unrolled and cut to a desired length.

BRIEF DESCRIPTION OF THE FIGURES

The invention will be better understood and other details, characteristics and advantages of the present invention will become clearer from the following description made by way of non-limiting example and with reference to the attached drawings, in which:

FIG. 1 is a schematic perspective view of a vehicle door;

FIG. 2 is a schematic perspective view of another vehicle door;

FIG. 3 is a schematic cross-sectional view of a seal according to one embodiment of the invention;

FIG. 4 is a partial schematic perspective view of a heating film of the seal of FIG. 3;

FIG. 4a is a larger scale view of a portion of the heating film of FIG. 4, and FIG. 4b is a larger scale view of another portion of the heating film of FIG. 4;

FIG. 4c is a cross-sectional view along the line IV-IV of FIG. 4, and FIG. 4d is a view similar to FIG. 4c and illustrating an alternative embodiment;

FIG. 5 is a schematic partial perspective view of the seal of FIG. 3, without a flocking;

FIG. 6 is a schematic partial perspective view of the seal in FIG. 3, with the flocking;

FIG. 7 is a schematic partial perspective view of a variant embodiment of a heating film;

FIG. 8 is a schematic perspective view of another variant embodiment of a heating film;

FIG. 9 is a larger scale view of a portion of the heating film of FIG. 8;

FIG. 10 is a schematic perspective view of another variant embodiment of a heating film;

FIG. 11 is a larger scale view of a portion of the heating film of FIG. 10;

FIG. 12 is a similar view to FIG. 11 and illustrates an alternative embodiment of the heating film; and FIG. 13 is a schematic cross-sectional view of a seal according to another embodiment of the invention.

DETAILED DESCRIPTION OF THE INVENTION

FIGS. 1 and 2 show doors 10 of motor vehicles.

In the case of FIG. 1, the door 10 comprises a lower rack 12 and an upper frame 14. The frame 14 has a general inverted U shape and defines with the rack 12 a space closed by a window 16.

The window 16 is movable from the upper position in which it occupies the space of the frame 14 to a lower position in which it is housed in the rack 12.

The door 10 comprises a seal or an assembly of seals intended to cooperate with the window 16 to provide a sealing between the window 16, on the one hand, and the rack 12 and the frame 14, on the other hand. This includes a water and dust sealing in particular.

A first seal 18 extends along an upper edge of the rack 12 and is conventionally referred to as a licker. When the window 16 is displaced, it rubs against the seal 18. A further seal 20 extends along the frame 14 and is generally U-shaped and referred to as a slide seal. The window 16 is engaged in grooves in the seal 20 which guides the window as it displaces and provides a holding and a peripheral sealing for the window when it is in the upper position in the frame 14. The seal 20 is carried by the door 10 and thus the sash.

In the case of FIG. 2, the door 10 comprises a rack 12 and does not comprise an upper frame. The door 10 is also equipped with a seal 18 of the licker type. In the upper position, the window 16 cooperates with a seal 22 (shown in dotted lines) which is carried by a door framing of the vehicle. The seal 22 is supported by the doorframe formed by the vehicle body shell.

The present invention relates to a seal for a window of a vehicle, this seal being, for example, a seal selected from the seals 18, 20 and 22, i.e. a licker, a slide seal, a door framing seal.

The particularity of the seal according to the invention is that it is heating.

FIG. 3 shows an embodiment of a heating seal according to the invention. The example shown represents a licker and it is understood that the invention is not limited to this particular application.

The seal 18 in FIG. 3 comprises a body 24 which has an elongated shape along an axis A and is made of at least one material. In the example shown, the body 24 comprises essentially two portions, namely a first sealing portion 24a and a second attachment portion 24b.

The sealing portion 24a is made of a first material and comprises at least one elastically deformable lip 26. The first material is for example: TPE or TPV or soft rubber.

The attachment portion 24b is made of a second material and has a general inverted U shape. This attachment portion 24b thus defines a groove 25 intended to receive a rebate of the door 10, and in particular of the upper edge of the rack 12. The second material is, for example, polypropylene possibly filled with, for example, glass fibres or talc, rubber of higher hardness, etc. The attachment portion 24b may be reinforced and comprise an internal armature 27, for example metallic.

The body 24 can be produced by extrusion, its two portions 24a, 24b being made and joined together during the manufacture of the body.

The seal 18 may comprise a trim element 29 fitted and attached, for example to the attachment portion 24b, so as to improve the aesthetics of the seal.

In the case of FIG. 2, the trim element 29 is located on the left-hand side of the drawing and is intended to be located on the outside of the vehicle. The lip 26 is located on the opposite side and therefore inside the vehicle. The window 16 displaces by rubbing or sliding on the lip 24.

The lip 26 comprises a lower longitudinal edge 26a for connection to the rest of the body 24, and an upper longitudinal edge 26b which is free and curved towards the outside of the vehicle. The lip 26 comprises a surface 28 which extends between the edges 26a, 26b on the inner side of the vehicle and which is covered by a flocking 30. The flocking 30 also has an elongated shape along the axis A.

The seal 18 further comprises at least one heating element extending along the axis A. This heating element is in the form of a multilayer film 34 which is interposed between the surface 28 and the flocking 30 in the example shown.

The film 34 is relatively thin and flexible. As can be seen in the drawing, the flocking 30 can cover the entire film 34 which is then invisible to the naked eye to a user of the vehicle or an operator who has to mount the seal on the vehicle (see FIG. 6). The flocking 30 covers a curved portion of the edge 26b and the film 34 may also extend into this area and thus comprise a curved portion in cross-section (see FIG. 1).

FIGS. 4, 4a and 4b illustrate an embodiment of the heating film 34. The film 34 comprises:
  at least two electrically conductive straight strips 36 which extend parallel to each other and to the axis A at a distance from each other and which are intended to be connected to an electrical circuit, and at least one resistive heating track 38 which extends between the strips and is connected to the strips.

In the example shown, the strips 36 are connected to the electrical circuit by connecting terminals 40 which are located here at a longitudinal end of the film 34 and may therefore be at a longitudinal end of the seal 18.

The terminals 40 are intended to be connected to an electrical energy source.

The terminals 40 each have a generally elongated shape and here extend perpendicular to the strips 36. The connection of the terminals 40 to the strips 36 can be carried out by overlapping the terminals 40 on the strips 36 or by overlapping the strips 36 on the terminals 40 (see FIG. 4c). To facilitate this overlap, the ends of the strips 36 connected to the terminals 40 may be at right angles.

In the example shown, a number of straight and parallel tracks extend perpendicular to the strips 36 and between these strips. As with the terminals 40, the connection of the tracks 38 to the strips 36 can be carried out by overlapping the tracks 38 onto the strips 36 or by overlapping the strips 36 onto the tracks 38 (see FIG. 4c).

The aforementioned overlaps are permitted due to the multilayer structure of the film 34. This film 34 preferably comprises a plastic support 42, for example PET. This support 42 is preferably thin and flexible.

The strips 36 and the tracks 38 can be deposited, preferably by printing, to this support 42. Inks are then used that are suitable for printing on the support 42 of the film 34. For example, a silver-based alloy can be used for the strips 36. For example, a carbon-based ink, such as with PTC effect, can be used for the tracks 38.

If the tracks 38 were printed first on the support 42, the strips 36 would then be printed on the support 42 and would partially overlap the tracks 38.

The metal terminals 40 are preferably crimped onto the lower strip 36, which may have a protuberance suitable for this crimping (see FIG. 4d). Alternatively, they can be attached with glue 44 to the support 42 and applied against the ends of the strips 36 (see FIG. 4c). In order to hold the assembly together, to protect it and to insulate it electrically, a passivation layer 46 is preferably deposited on the entire support 42 and thus covers the strips 36, the tracks 38, and the portions of the terminals 40 connected to the strips. It is therefore understood that the terminals 40 retain free ends 40a not covered by this passivation layer to allow electrical connection of the film to the circuit.

FIG. 3 shows one possible position of the terminals 40. These terminals 40 preferably extend downwards when the seal 18 is in the mounted position on the door.

These terminals 40 are preferably housed inside the rack 12 of the door 10 so that the connection to the circuit can take place inside the rack, i.e. in an area protected from moisture.

FIG. 5 shows the inner face of the seal 18 of FIG. 3, with the heating film 34 but without the flocking 30. FIG. 6 shows the complete seal 18 with its flocking and allows to show that the film is completely covered and therefore hidden and protected by the flocking 30, except for the ends of the terminals 40.

The flocking 30 is a layer of fibres, usually short and thin. The fibre layer can be formed directly on the heating film 34. Alternatively, the flocking 30 may comprise a fibre layer and a support, for example plastic, for this fibre layer.

The flocking 30 can be attached by gluing to the heating film 34. For this purpose, a glue layer 48 can be provided on the film 34, and in particular on the passivation layer 46. The glue layer 48 is then covered by the flocking 30, i.e. the fibre layer is deposited onto this glue layer 48, or the support carrying the fibre layer is applied to this glue layer 48.

The film 34 may comprise a further glue layer 50 on its lower face opposite the flocking 30, in order to ensure its attachment to the surface 28. This glue layer 50 is for example a heat-activated glue layer.

In the present application, "glue" 44, 48, 50 means either a composition with evaporable solvent, but also, by extension, a hot-melt and heat-activated composition, or a double-sided adhesive.

In the aforementioned example, it is thus understood that the heating film 34 comprises several layers which are, from bottom to top, a glue layer 50, a support 42, electrically conductive strips 36, the tracks 38, the passivation layer 46, and the glue layer 48.

FIG. 7 shows an alternative embodiment of the heating film 34 which differs from that described above essentially in that its terminals 40 are located away from the longitudinal ends of the film 34 and may therefore be located away from the longitudinal ends of the seal 18.

FIG. 8 illustrates another embodiment of the heating film 34 which comprises two adjacent sections S1, S2 located next to each other and having independent operations. The first section S1 extends along one half of the length of the film 34 or the support 42 and can be activated independently of the second section S2 which extends along the remaining half of the film or the support. The two sections are an extension of each other.

The first section S1 of the film comprises two electrically conductive strips 36 between which at least one resistive track 38 extends and which are connected to two connecting terminals 40.

The second section S2 of the film comprises two further electrically conductive strips 36 which extend respectively in continuation of the strips 36 of the first section S1 and between which at least one resistive track 38 extends. These other strips 36 are also connected to two connecting terminals 40.

The terminals of both sections S1, S2 are connected to the same electrical circuit.

FIG. 9 is a larger scale view of portion of FIG. 8 and allows to show that each of the sections S1, S2 comprises a single resistive track 38. This track 38 has a length approximately equal to the length of the strips 36. The track 38 is therefore much longer (e.g. more than 50 times) than it is wide.

FIGS. 10 and 11 show a further embodiment of the heating film 34 in which the tracks 38 have identical lengths L but are located at a varying distance (P1, P2) from each other. Near the longitudinal ends of the film 34, the pitch P1 between two consecutive tracks 38 is the smallest, and this pitch increases as one approaches the middle of the film (P1→P2) where the terminals 40 are located.

The tracks 38 have identical widths.

FIG. 12 shows a further alternative embodiment of the heating film 34 in which the tracks 38 have varying lengths (L1, L2) and are separated from each other by a constant pitch (P). Near the longitudinal ends of the film 34, the tracks have the greatest length (L1), and this length decreases as one approaches the middle of the film (L1→L2) where the terminals 40 are located.

The tracks 38 have identical widths.

In yet another variant not shown, the heating film could comprise several tracks fed by several pairs of electrical connecting terminals. Each of the pairs would provide power supply to one of the tracks.

In yet another alternative embodiment, the terminals could be connected to the electrical energy source by a control system that would be connected to an external or atmospheric temperature sensor of the vehicle. For example, the system would be configured to activate the heating when the temperature is below a certain threshold, for example 5° C., and to inhibit heating above that threshold.

In yet another alternative embodiment, the control system could be configured to control the heating as a function of a speed of displacement of the window intended to cooperate with the seal so as to optimise the contact time between the seal and the window and thus the defrosting of the window.

FIG. 13 illustrates a further alternative embodiment of a seal according to the invention in which the support lip 26 of the heating film 34 comprises an integrated hinge 31a. This hinge 31a extends in a longitudinal direction and therefore parallel to the axis A. It separates the lip 26 into two longitudinal segments, upper 26c and lower 26d respectively.

The upper edge 26b of the lip 26 is curved as mentioned above. Its lower edge 26a is connected to the rest of the body 24 and can form a further integrated longitudinal hinge 31b. The hinges 31a, and 31b are spaced apart and allow the lip to deform to best fit the shape of the window 16 and optimise the contact surface area with the window and therefore the defrosting capability of the window.

It can be seen that the hinge 31a is formed by a thinning of the lip 26 or by a longitudinal groove 33. This groove 33 is formed on a face of the lip 26 opposite the surface 28.

The surface 28 extends over at least one of these longitudinal segments 26c, 26d, and over both segments in the example shown. The flocking 30 thus extends over the two segments 26c, 26d in the example shown. The heating film 34 is located on at least one of these longitudinal segments 26c, 26d, and only on the segment 26c in the example shown. The flocking extends substantially from the upper edge 26b to the second hinge 31b.

In yet another variant, not shown, the seal would comprise two or more lips, each of which would be equipped with a film heating element and would be intended to cooperate with a single window.

The film 34 is preferably configured to be powered at an electrical power of less than 150 W and which is for example between 10 and 100 W. It can be configured to heat to a temperature of between 1 and 100° C. at an atmospheric temperature of, for example, −40 to 10° C.

As mentioned above, the film 34 can be used in several types of vehicle window seals. Advantageously, before the heating film is mounted on a seal, it can be wound into a reel. The reel may comprise a single heating film or a plurality of successive heating films arranged in sequence and which may be separated from each other by, for example, detaching or cutting. Alternatively, the heating films are produced independently of each other.

The mounting of the heating film on a seal can be carried out directly on a manufacturing line of the seal or can be carried out on a specific seal for a new vehicle or for the replacement of a conventional vehicle seal with a heating seal.

The invention claimed is:
1. A seal for a window of a vehicle, said seal comprising:
   a body which has a generally elongated shape along an axis and which is made of at least one material,
   at least one flocking located on a surface of said body and extending along said axis, and
   at least one heating element extending along said axis,
   wherein said at least one heating element comprises at least one multilayer heating film which has a generally elongated shape along said axis and which is interposed between the flocking and said surface of said body, said heating film comprising:
   at least two electrically conductive straight strips which extend parallel to each other and to said axis, at a distance from each other, and which are intended to be connected to an electrical circuit, and
   at least one resistive heating track which extends between said strips and is connected to said at least two electrically conductive straight strips.

2. The seal according to claim 1, wherein the body comprises an elastically deformable lip which extends along said axis and which comprises said surface.

3. The seal according to claim 2, wherein the elastically deformable lip comprises two adjacent longitudinal segments connected each other by a first longitudinal hinge integrated into said elastically deformable lip, said at least one flocking extending over at least one of those longitudinal segments and said at least one heating film being located on at least one of said longitudinal segments.

4. The seal according to claim 1, wherein said strips are connected respectively to at least two terminals for connection to said electrical circuit.

5. The seal according to claim 4, wherein said flocking covers said strips and the track or the tracks, but does not cover said terminals.

6. The seal according to claim 1, wherein the strips and the track or the tracks are covered by a passivation layer, and said flocking covers said passivation layer.

7. The seal according to claim 1, wherein the strips have a width or transverse dimension of between 0.2 and 10 mm.

8. The seal according to claim 1, wherein the at least one heating track has an axial length or dimension of between 0.1 and 25 mm.

9. The seal according to claim 1, wherein the electrically conductive strips are made of silver, and/or the track or the tracks are made of carbon.

10. The seal according to claim 1, wherein the electrically conductive strips and/or the track or the tracks are printed and cured ink layers.

11. The seal according to claim 1, wherein the strips and the track or the tracks are carried by a plastic support.

12. The seal according to claim 1, wherein said heating film comprises at least one glue layer.

13. The seal according to claim 1, wherein the heating film has a thickness of between 10 and 500 μm, and/or a width or transverse dimension of between 2 and 10 mm.

14. The seal according to claim 1, wherein the heating film is integrally covered by the flocking.

15. The seal according to claim 1, wherein the heating film comprises a plurality of tracks connected to said strips.

16. The seal according to claim 1, wherein said 5 heating film comprises two first electrically conductive strips between which at least one heating resistive track extends, and two second electrically conductive strips between which at least one further heating resistive track extends, said second strips extending in the extension of said first strips.

17. The seal according to claim 1, wherein the heating film is configured to be powered at an electrical power of less than 100W per metre.

18. The seal according to claim 1, wherein the heating film is configured to heat to a temperature of between 1 and 100° C. at an outside atmospheric temperature of between −40 and 10° C.

19. An assembly comprising a seal according to claim 1, and a window of a vehicle, in particular for a motor vehicle, the window being configured to cooperate with the seal by sliding on its flocking.

\* \* \* \* \*